United States Patent
Rendon Granados

(10) Patent No.: US 9,139,470 B2
(45) Date of Patent: Sep. 22, 2015

(54) CHEMICAL PROCESS FOR OBTAINING GLASS WITH A TOTAL OR PARTIAL SATIN/MATTE FINISH COMPRISING IMMERSION IN AN ACID SOLUTION, FOR SIMULTANEOUS AND CONTINUOUS PRODUCTION

(76) Inventor: Juan Luis Rendon Granados, Celaya (MX)

( * ) Notice: Subject to any disclaimer, the term of this patent is extended or adjusted under 35 U.S.C. 154(b) by 1347 days.

(21) Appl. No.: 11/792,657
(22) PCT Filed: Sep. 29, 2005
(86) PCT No.: PCT/MX2005/000087
§ 371 (c)(1), (2), (4) Date: Sep. 24, 2008
(87) PCT Pub. No.: WO2006/062386
PCT Pub. Date: Jun. 15, 2006

(65) Prior Publication Data
US 2009/0136762 A1    May 28, 2009

(30) Foreign Application Priority Data
Dec. 10, 2004 (MX) .................... GT/a/2004/000020

(51) Int. Cl.
C03C 15/00 (2006.01)
C03C 23/00 (2006.01)
(52) U.S. Cl.
CPC ............ *C03C 15/00* (2013.01); *C03C 23/0075* (2013.01)
(58) Field of Classification Search
None
See application file for complete search history.

(56) References Cited

U.S. PATENT DOCUMENTS 3,198,747 A    8/1965 Cook et al.
3,239,324 A    3/1966 Monks, Jr.

(Continued)

FOREIGN PATENT DOCUMENTS

CN    1357781        7/2002
DE    4312069 A1 *  10/1994

(Continued)

OTHER PUBLICATIONS

EPO Machine Translation of DE4312069A1 performed on Feb. 8, 2012.*

(Continued)

*Primary Examiner* — Lisa Herring
(74) *Attorney, Agent, or Firm* — Thorpe North & Western, LLP

(57) ABSTRACT

The invention relates to a chemical process for obtaining glass with a total or partial satin/matte finish, comprising immersion in an acid solution, for the simultaneous and continuous production of one or more parts and/or sheets of glass having standard, special or variable dimensions, thicknesses, colours, uses and applications. The inventive process can be used to obtain glass with a total or partial satin/matte finish in a simultaneous and continuous manner either on one or both sides of the glass (atmospheric side and tinned side) or of several glass sheets and/or parts at the same time, with different thicknesses, measurements, colours, uses, specifications and characteristics, said process being performed simultaneously by means of immersion. According to the invention, containers of glass sheets are immersed in containers of chemical solutions using a variable-speed transport immersion crane. The aforementioned containers are encapsulated such that the process can be controlled fully (safety, quality and environment). The inventive system also comprises a drying chamber. The purpose of the process is to enable the versatile, cost-effective, efficient, productive production of a glass with a total or partial satin/matte finish, having the above-mentioned characteristics and using different types of glass, with improved quality on one or both sides thereof, while guaranteeing full physical and environmental safety, since each of the operations in the process is fully and safely controlled.

1 Claim, 8 Drawing Sheets

(56) References Cited

U.S. PATENT DOCUMENTS

| | | | |
|---|---|---|---|
| 3,374,130 A * | 3/1968 | Chabal et al. | 216/97 |
| 3,374,141 A * | 3/1968 | Junge et al. | 428/433 |
| 3,956,076 A | 5/1976 | Powell, Jr. et al. | |
| 4,086,074 A | 4/1978 | Minot et al. | |
| 4,714,010 A | 12/1987 | Smart | |
| 5,196,088 A * | 3/1993 | Soda | 216/36 |
| 6,228,211 B1 * | 5/2001 | Jeong | 156/345.11 |
| 6,471,880 B1 * | 10/2002 | Trouve et al. | 216/31 |
| 2002/0139475 A1 * | 10/2002 | Chen et al. | 156/345.23 |
| 2003/0170459 A1 * | 9/2003 | Lin | 428/410 |
| 2003/0205558 A1 * | 11/2003 | Kuzuwa et al. | 216/97 |
| 2004/0206713 A1 | 10/2004 | Lloyd et al. | |
| 2010/0129606 A1 | 5/2010 | Rendon Granados | |

FOREIGN PATENT DOCUMENTS

| | | |
|---|---|---|
| EP | 0314632 A1 | 5/1989 |
| GB | 1276550 | 6/1972 |
| JP | 1102401 | 4/1989 |
| WO | WO-0190015 | 11/2001 |
| WO | WO 2006/062386 | 6/2006 |

OTHER PUBLICATIONS

Honeywell, "Hydrofluoric Acid Properties", Specialty Chemicals, vol. 1.1, Jan. 2002, cover pg. and p. 5.*

English Translation of DE4312069A1 Performed by USPTO translator Apr. 4, 2014.*

U.S. Appl. No. 11/792,641, filed Feb. 9, 2010; Juan Luis Rendon Granados; office action dated Oct. 10, 2012.*

PCT Application PCT/MX2005/000087; filing date Sep. 29, 2005; Juan Luis Rendon Granados; International Search Report mailed Feb. 2, 2006.

* cited by examiner

CHEMICAL PROCESS FOR OBTAINING GLASS WITH A TOTAL OR PARTIAL SATIN/MATTE FINISH COMPRISING IMMERSION IN AN ACID SOLUTION, FOR SIMULTANEOUS AND CONTINUOUS PRODUCTION

BACKGROUND OF THE INVENTION

1. Field of the Invention

A production process for obtaining glass with satin/matte finish, comprising immersion and acid solution is more efficient than heretofore known processes. The inventive process minimizes the waste of the materials and the costs because the use of fully-loaded containers in addition the product has better quality than others due to that we produce glass with a total or partial satin/matte finish in one or both sides of the sheet of glass (atmospheric side and tinned side), moreover its risk of production is smaller due to the manipulation is not direct. The process comprising immersion in an acid solution, and simultaneous and continuous manner, because it uses one or several pieces of glass at the same time, since the acid solutions always remain in the containers and these chemical solutions are not degraded. Both the chemical solutions containers and the glass pieces and/or sheets containers (used for the transportation and immersion of the glass pieces) are coated with special resistant material to the acid attack allowing the process by immersion.

2. Background Art

These products were developed for covering expectations in both national and international market for processing the glass sheets from Mexico and satisfying special and variable market. In Mexico and in several countries this satin/matte process does not exist, it means this process is novel.

Figure 1:
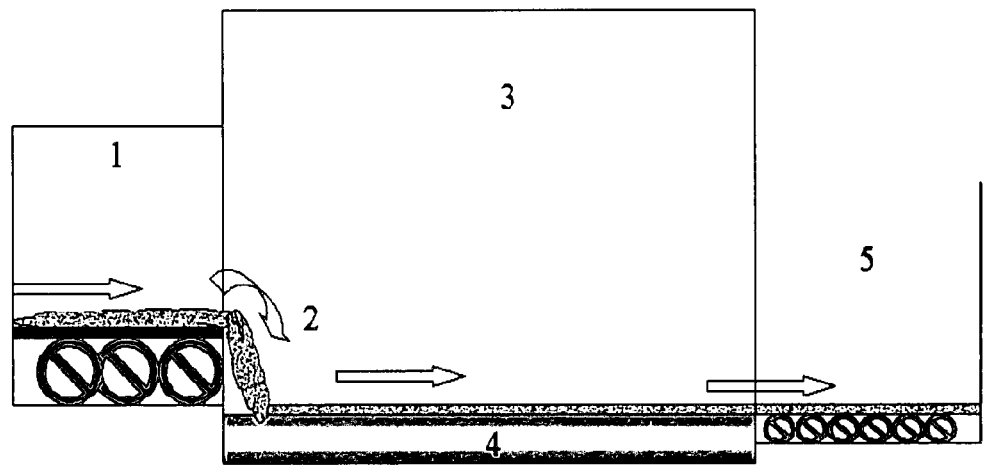

For obtaining products from float glass we have used sheets of float glass which are produced by flotation of melted glass on a bed of tin as shown in FIG. 1. FIG. 1 shows a lateral view of this process of manufacture of float plane glass; this process comprises the raw materials that constitute the float glass are mixed previously before entering the melting furnace (1), where liquid glass is formed (2), this glass goes towards the tin bath (3) where the glass floats on the liquid tin bed (4) forming the sheet of glass with the required thickness, (5) then cooled for later cut according to the required dimensions. The glass sheets have two sides, one of them was in contact with liquid tin (tinned side) and the other one was in contact with the atmosphere (atmospheric side) in the melting furnace.

The traditional method for obtaining satin/matte glass is made placing the piece of glass on a special table, only the superior side (atmospheric side) will be in contact with the solution or paste, and the other side will be sealed for avoiding the contact with the chemical solution; this seal is wax put on the periphery edge. The time of contact is variable and when the process is finished the chemical solution or paste is transferred to another container, then the glass piece is washed for eliminating the acid residues spilt them on a container like waste. By means of this procedure it is not possible to treat the tinned side of glass piece, because in this side are adhered the residues of tin and they do not allow the attack of the solutions in homogenous form, besides just one piece and one side must be treated per time, the materials are missing during the process, the risk of manipulation by acid solution is higher, so that the traditional process has poor yield, quality, high cost and risk for manipulation. The prior art do not describe any information about chemical agents nor processes, that divulge methods or systems for producing glass with satin/matte finish with high quality, smooth texture, with sight and tact pleasant appearance, by one or both sides of the glass (atmospheric side and tinned side) of any thicknesses and colors, as this invention refers. It has been very important to use materials resistant to acid attack, many of them were tested by us like polymers and copolymers, the material that we propose in this invention it has been the better at the moment, which is described ahead. The purpose of the process is to enable the versatile, cost-effective, efficient, productive production of a glass with a total or partial satin/matte finish, having the above-mentioned characteristics and using different types of glass, with improved quality on one or both sides thereof, while guaranteeing full physical and environmental safety, since each of the operations in the process is fully and safely controlled, for example the workers do not have direct contact with the process and the environmental risks are lower due to use the encapsulated containers for the chemical solutions. So that, this patent present a process of immersion like so, which covered containers and design permit to manipulate chemical solutions, and the formulation of the solutions are the development of our invention, as well as the product obtained: the glass with satin/matte finish.

BRIEF DESCRIPTION OF THE ACCOMPANYING DRAWINGS

FIG. 1. The figure shows the tin chamber and smelting furnace for obtaining float glass.

Figure 2:
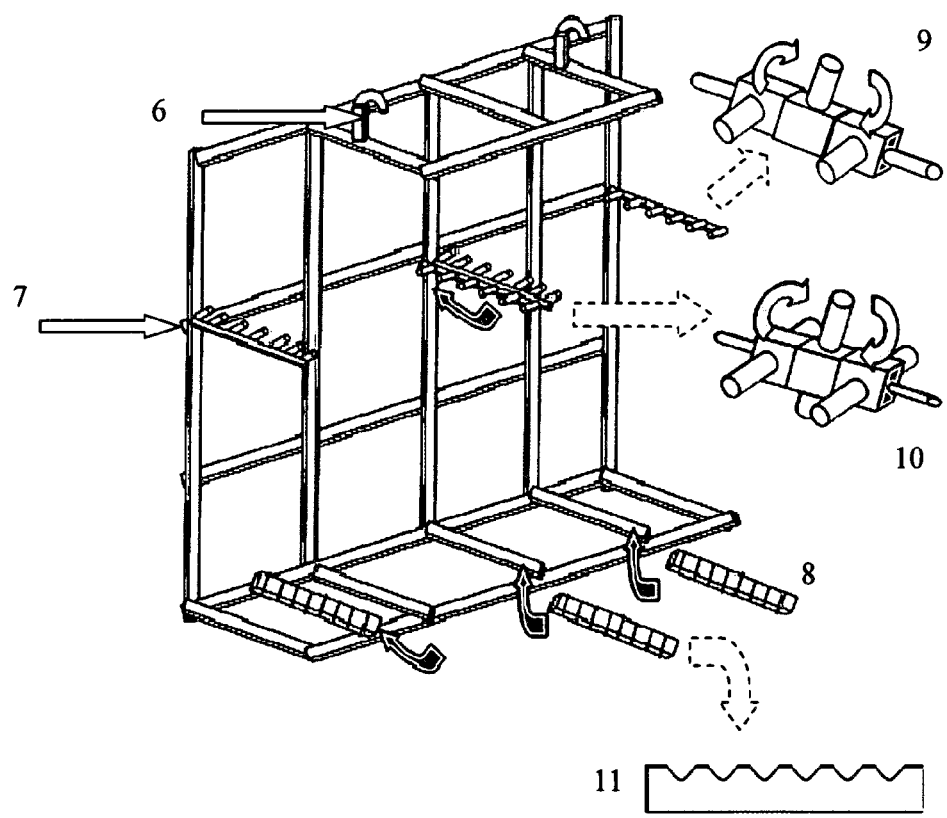

FIG. 2. The figure shows the sheets of glass container used for treatment by immersion.

Figure 3:
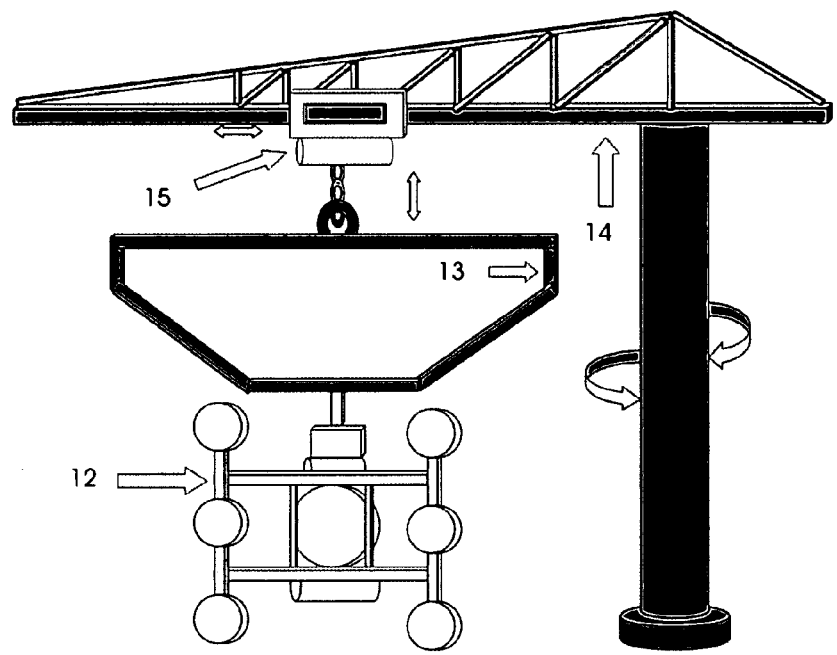

FIG. 3. The figure shows the "flag" type system, for loading and unloading the sheets of glass.

Figures 4, 5:
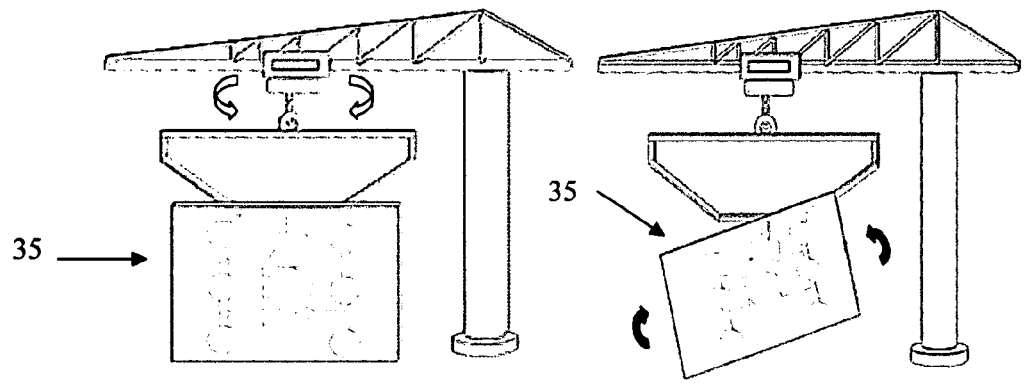

FIG. 4. The figure shows the vertical form for taking the sheets.

FIG. 5. The figure shows the angle-like loading of the glass sheets.

Figure 6:
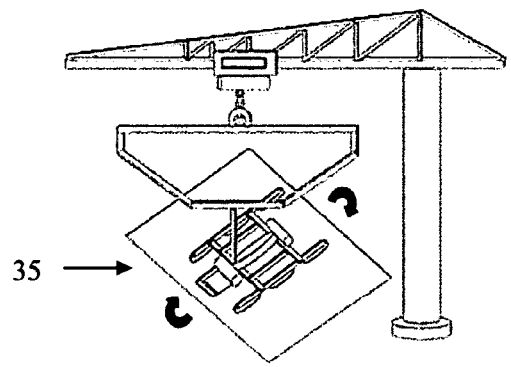

FIG. 6. The figure shows the horizontal loading of the glass sheets.

Figure 7:
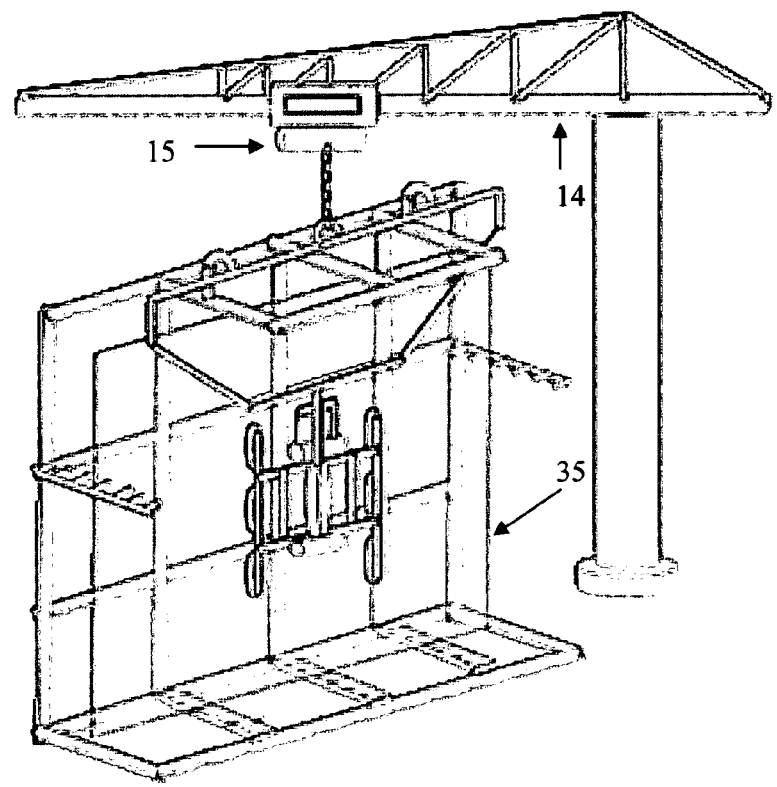

FIG. 7. The figure shows how is loading and unloading of the glass sheets in the glass pieces and/or sheets container.

Figure 8:
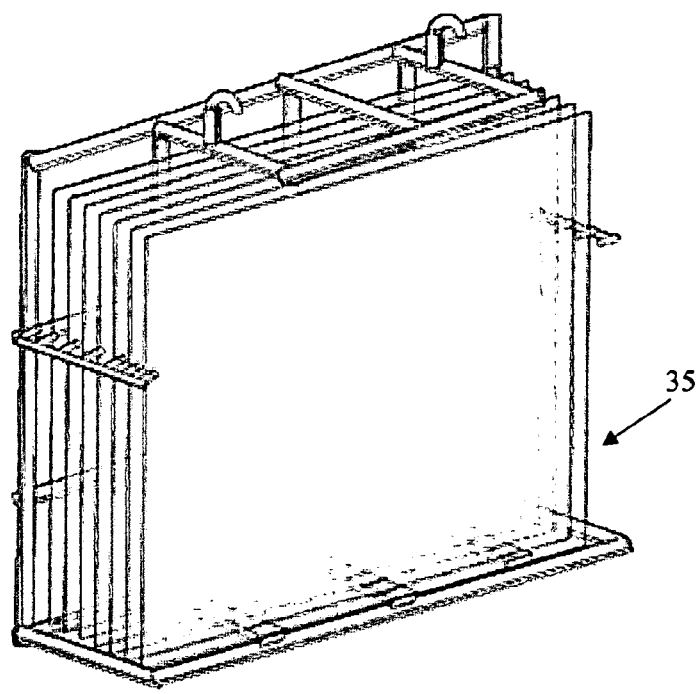

FIG. 8. The figure shows the glass pieces and/or sheets container with loaded glass.

Figure 9:
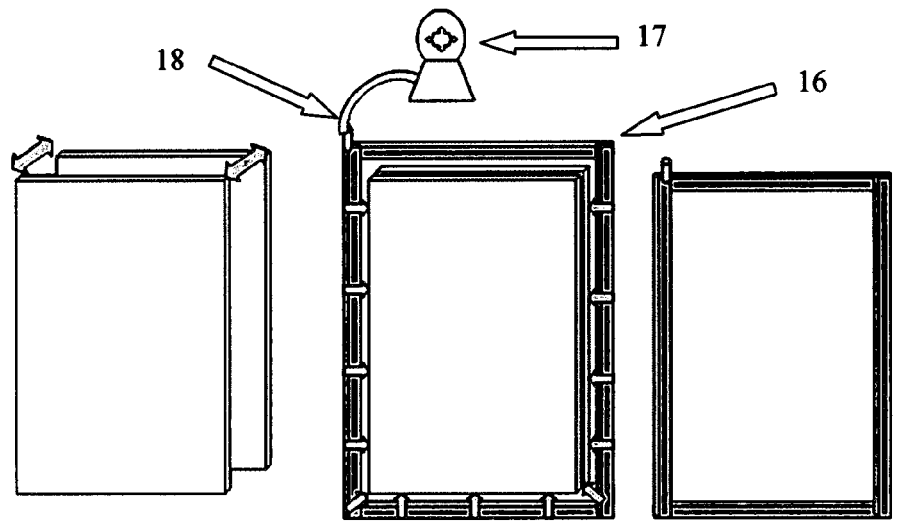

FIG. 9. The figure shows pneumatic seal with suction cups for joining two sheets of glass, by means of vacuum pressure for treating the glass sheets with satin/matte finish.

Figure 10:
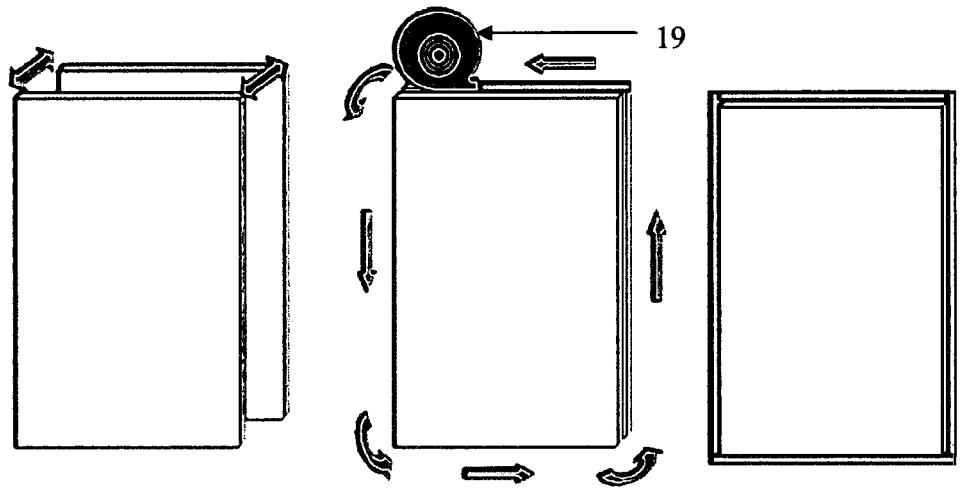

FIG. 10. The figure shows the seal of two sheets of glass by sticky tape for joining the sheets for treating them with satin/matte finish.

Figure 11:
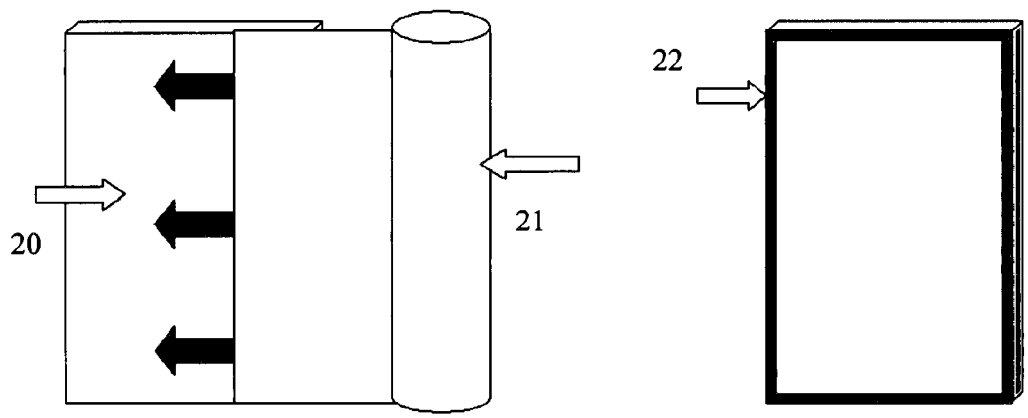

FIG. 11. The figure shows the protection of the sheets of glass by adhesive film roll.

Figure 12:
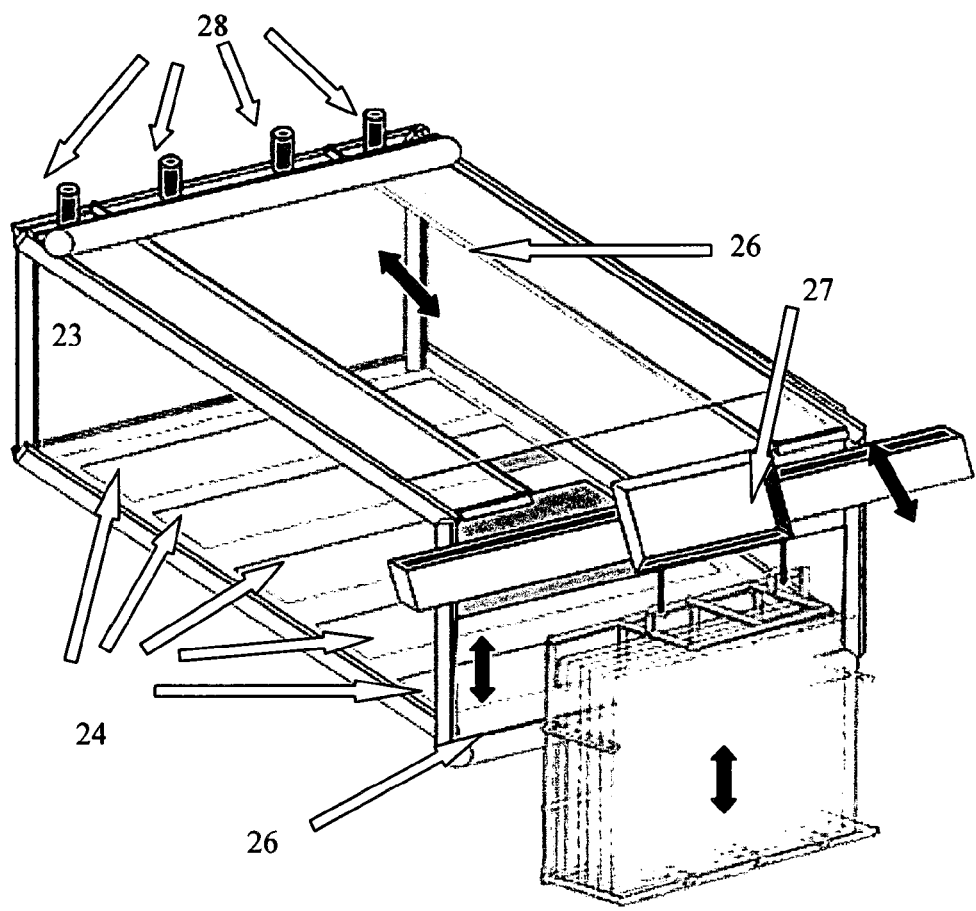

FIG. 12. The figure shows the encapsulated containers of chemical solutions used in this process.

Figure 13:
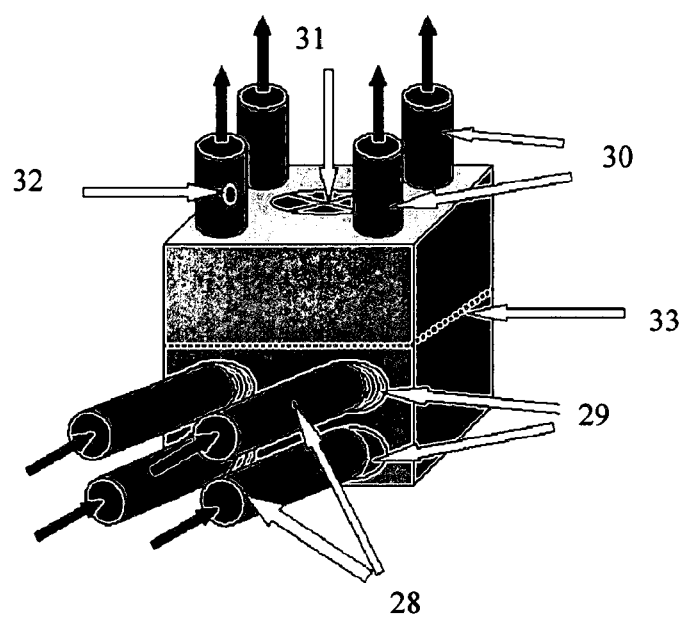

FIG. 13. The figure shows the gas washer (degassing).

Figure 14:
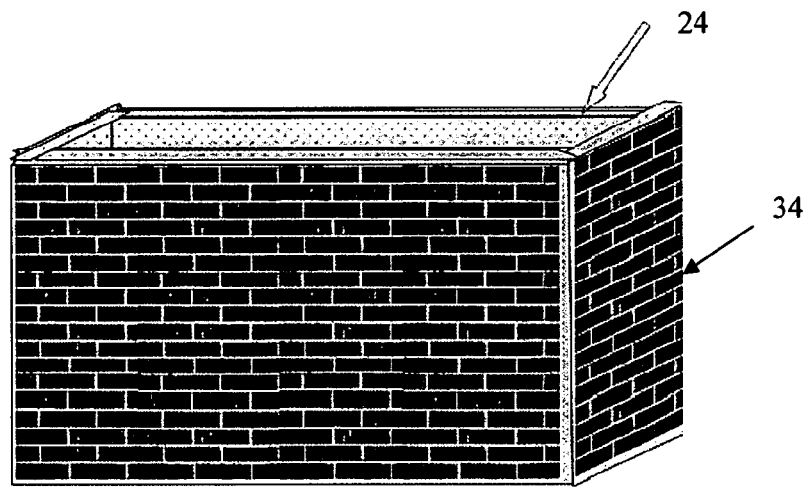

FIG. 14. The figure shows containers of chemical solutions.

Figure 15:
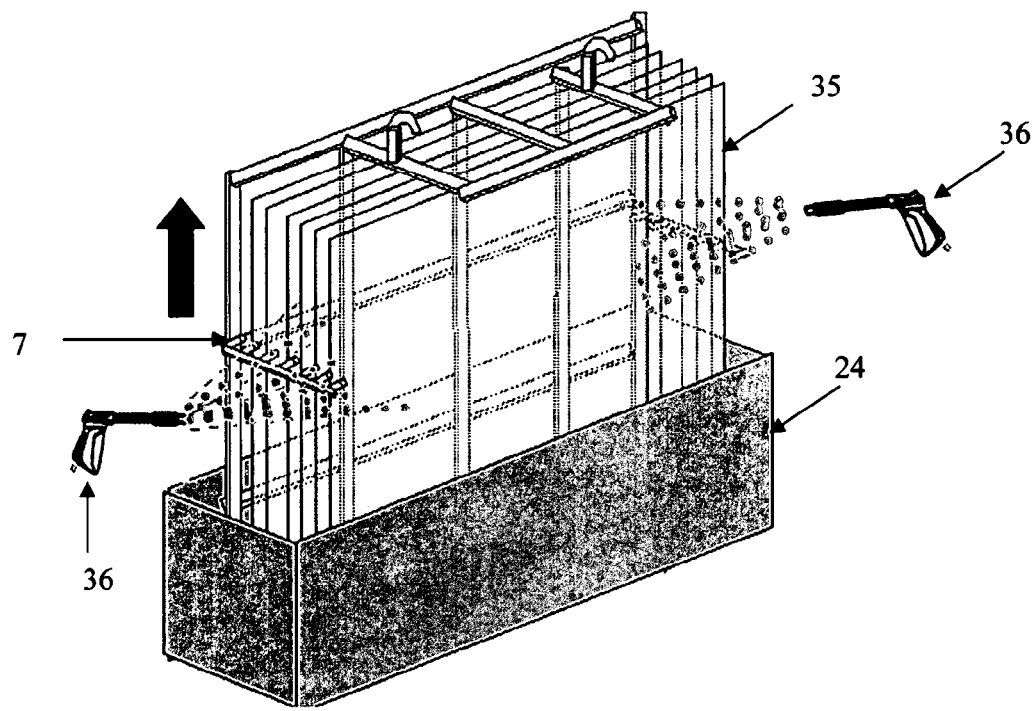

FIG. 15. The figure shows hydro pneumatic wash system.

Figure 16:
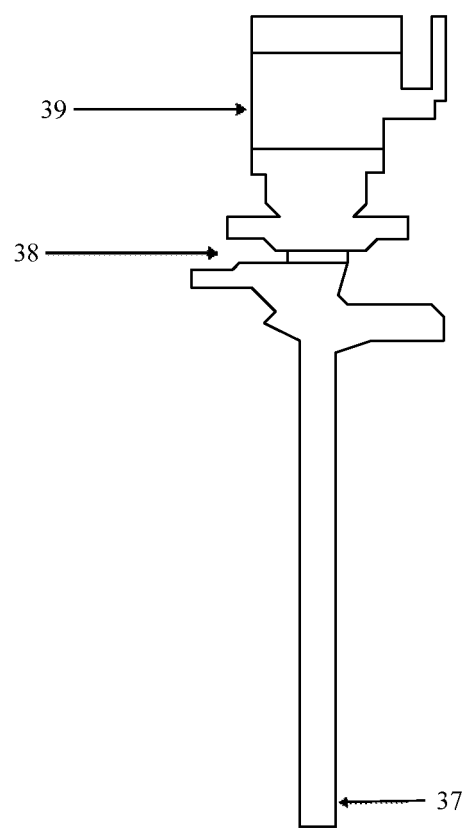

FIG. 16. The figure shows the high density polyethylene or polypropylene pneumatic pump.

Figure 17:
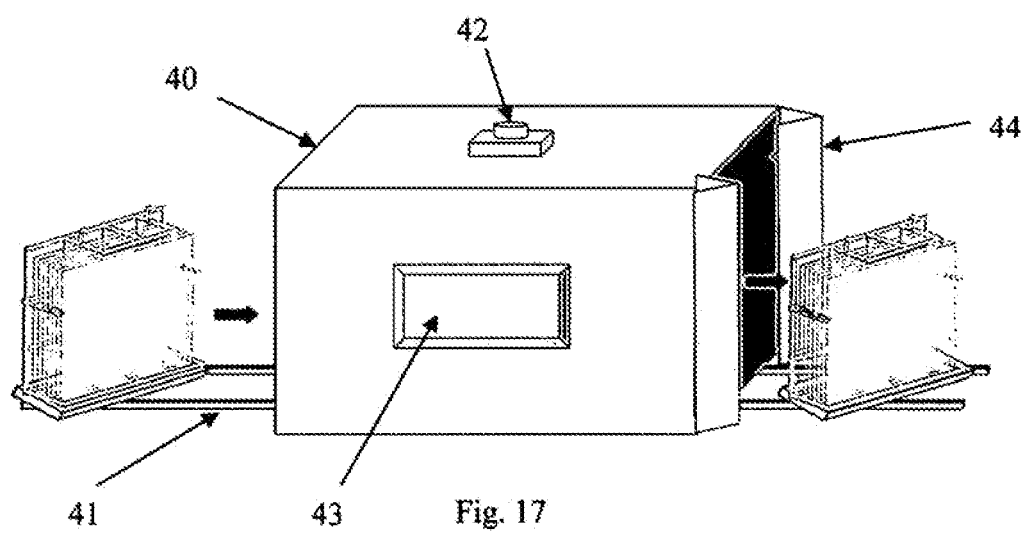

FIG. 17. The figure shows the continuous dryer "tunnel" type.

DETAILED DESCRIPTION OF PREFERRED EMBODIMENT

We desire to claim in this patent the chemical process for obtaining float glass with satin/matte finish, comprising immersion in an acid solution, for simultaneous and continuous production in a total or partial glass sheets for producing one or several pieces of glass with different dimensions, thicknesses, colors, standard uses and applications; said glass sheets may be treated in both sides, atmospheric side and tinned side, or just in one of them; of indistinct manner. The glasses produced by said process are characteristics, besides the equipment, apparatuses, and materials were specially designed for this process. We describe below each one. The chemical process for obtaining glass with satin/matte finish of one or several pieces has the following stages:

a) reception of glass pieces and/or sheets,
b) loading of the glass pieces and/or sheets into the glass containers,
c) processing of the glass pieces and/or sheets by immersion in acid solution,
d) drying of the glass pieces and/or sheets,
e) unloading of the glass pieces and/or sheets from its containers.

a) Reception of the Glass Pieces and/or Sheets

A stock of glass pieces and/or sheets is received in specially designed trucks. An adapted crane is used to unload the truck; this "bridge" type crane has 3 tons in capacity, 15 meters in width, 20 meters in length and 5 meters in height; it has a microelevation speed of 0.5 meters per minute, elevation speed is variable from 0.5 meters per minute to 5.2 meters per minute; also a motor reducer speed is variable from 5.1 meters per minute to 15.4 meters per minute. The same "bridge" type crane is used for loading the packages of satin/matte glass on trucks, for delivering, distributing and transporting them. The crane used for loading and unloading allows fast processing of the glass. It is noteworthy that the absence of the above mentioned crane would increase operations time and associated costs. Also, physical risk for the personnel and the materials is minimized. Glass pieces and/or sheets are unloading from to the truck to be stored in special containers for further processing b) Loading of the Glass Pieces and/or Sheets into the Glass Containers To convey glass pieces and/or sheets during the production process, a specially designed container is used to allow us fast processing of the glass on both sides (tinned side and atmospheric side) simultaneously. This way allows a higher production rate in contrast to the already-known traditional process; it also minimizes personnel risk since there is no direct manipulation. Glass pieces and/or sheets are vertically placed in the special container with 2500 Kg of load as shown in FIG. 2 and by means of a traveling crane; the glass is ready for the immersion process.

The specially-designed containers are made of rectangular tubular steel profile (ptr) of 7.62 centimeters per 5.08 centimeters and its unique design can hold static and dynamic stresses that are present during the production process. The glass pieces and/or sheets container has 295 centimeters in height, 360 centimeters in length and 69 centimeters in width; into the glass sheets can be collocated, their dimensions can be variable form higher standard (360 per 260 centimeters) to smaller sheets; their types, thicknesses and colors can be different; this characteristic is due to inferior supports, (8) (expanded view (11)), located on the base, that can be put the pieces in any position. This container has a movable double pivot (10) to manipulate small pieces, which is removable to manipulate sheets of 360 centimeters. It can be modifiable the glass pieces and or/sheets containers according to necessities. In its inferior position 3 supports are collocated, which are made of polypropylene plate however may be used any resistant polymer to acid attack, said supports are grooved and each one has 59 centimeters in length and 5.08 centimeters in height with separation of 3 centimeters between each groove, which permit the flow solutions onto the glass, each groove receive each piece or sheet. The lateral position of the container has movable simple pivots (7) are made of polypropylene or high density polyethylene plate and bar, because they are resistant to the acid attack, each one of said pivots can turn on its axis, to put on vertical position for receiving the glass sheets, and soon happen pass to a horizontal position to maintain them (9); when the small sheets are manipulated, a movable double pivot is collocated in the middle of the container and can turn on its axis, said pivot is made of polypropylene or high density polyethylene plate and bar because these materials are resistant to acid attack, using this pivot, the container can be divided in two parts, each part can put independent sheets. The superior position of container has 2 hooks to balance the container load and to hold said container onto traveling crane "bridge" type for transporting and immersing the glass sheets in to the solution containers; its gravity center was calculated for stabilizing totally the container.

The glass pieces and/or sheets container resist the chemical treatment by having a covering with an accelerated thyxotropic polyester resin in conjunction with the catalyst methylethyl-ketone peroxide in dimethyl ftalate at 50%, The load of glass pieces and/or sheets is storage into the trestle (12), by manual or pneumatic way. The pneumatic way consists of 6 pneumatic cupping glasses connected to a vacuum pump of 14 of H.P. with capacity until 500 kilograms, the cupping are located on framework specially designed to permit it entrance to the container (13), said cupping system has flexible movements due to turn 3600 since they are placed to an endless bullet mold by means of a cable to the chain-hoist (15); said chain-hoist is in the riel of "flag" type crane (14), this cupping system is versatile because take the glass sheets (35) in vertical form (FIG. 4), horizontal form (FIG. 5), or any ankle (FIG. 6), and runs in both directions from one side to another to take or to deposit the glass sheets by means the riel trole (FIG. 7). The crane enlistment the container once the container is loaded with the glass sheets, and is ready for the process.

Approximately, we process 2500 Kg per container by 1 hour and 20 minutes, or 2106 Kg of glass sheets per hour, this capacity may be increased according to production necessities.

The container permit to process any kind of glass pieces or sheets, totally or partially as: recordable, paints or any form, on any side of the float glass at room temperature. It is possible to satin/matte two mirror sheets or two float glass sheets, united by the coat of paint side (to protect it) (20) or any sides if float glass sheets are treated, using a pneumatic seal (16) with vacuum pressure (17) by means of valve (18), this seal join perfectly both sheets. Said pneumatic seal is made with nitrile rubber or synthetic seal (Viton™); said materials are resistant to acid attack (FIG. 9). This process could be made with two sticky tapes (19) one of them with adhesion in both sides to unite both sheets and the other type has adhesion just on one side for sealing the edges of the sheets (FIG. 10). This process could be made with the application of a seal (20) of auto-adherible polyethylene plastic (21), resistant to acid attack and U.V. protection, with acrylic adhesive (FIG. 11); the sheets edges are re-forced with tape used in air conditioned ducts (22). Depending on the paint, is possible do not use any protection minimizing costs and increasing the productivity.

c) Processing of the Glass Pieces and/or Glass Sheet by Immersion

The total or partial satin/matte chemical process for of glass by immersion in acid solution for simultaneous and continuous production, of one or several pieces and/or sheet of glass of dimensions, thicknesses, colors, uses and standard, special and variable applications (FIG. 12); it has sequential seven of chemical solutions container (24) of 4.31 meters in length by 0.96 meters in width and 3.58 meters in depth (these are interiors measurements), counting on a thickness brick wall of 32 cm. and flattening of 2 cm. of cement with biphenolic resin and a layer with fiber glass of 0.7 cm. of thickness; said container is covering with of polypropylene or high density polyethylene plate of 0.635 cm. of thickness, having the dimensions necessary to introduce into the glass pieces and/or sheets container, which can be adaptable to production necessities. For avoiding the acid gas emanation towards to the rest of installation, all these chemical solutions containers are isolated by means of an encapsulated system whose walls are made of rectangular tubular steel profile covered with polyethylene (23); besides providing a security process.

This encapsulated system has two curve-slide awnings when the crane enters to chemical solutions containers whose sliding on rails mounted throughout the lateral walls covering the solutions containers, running an awning back to crane and the other in front of it (26) sealing completely the solutions containers or bathtubs by means of encapsulated all the process is totally isolated and giving security of personnel, whose have a security equipment eliminating any risk; this system avoid the corrosive action of the acid solutions.

Said encapsulated system has the gas exit by means of eight extractors transporting the acid steam (28) towards the gas washers (FIG. 13), having an absorption and neutralization of these acid steam in a volume of 64000 cubic meters per hour in all system, both gases washing have four extractors of 0.25 H.P. each one (29); the gas washers have a capacity of 1000 liters, operating with a nominal volume of 220 liters (33); the gas washing solution is sodium hydroxide at 4%; this extraction allows us to unload to the outer atmosphere a neutral and inert gas by the exit chimneys (30); said chimney has a gas sampling port (32) to evaluate the process analyzing it every 6 months according to the environmental Mexican norms (NOM02). In order to renew and to maintain the level of the washing solution the system has an access floodgate (31), however this capability of system to increase it according to the production necessities.

Each chemical solution container has a volume of 13000 liters to room temperature for assuring the total glass covered when the immersion is made. Said solutions containers have a system of agitation and movement with compressed air provided by a 135 compressor of psi of 30 amperes and 2.5H.P. for homogenizing the solution and removing the accumulated remainders.

These chemical solutions containers (34) are under the level of the floor (with 4.5 m indepth) however they could be on the floor level; these seven containers are constructed of concrete armed with a double wall of partition or brick (FIG. 14) with a flattened covering cement type and a biphenolic resin layer with fiber glass; they were constructed calculating the support mechanical, static and dynamic efforts and pressures exerted on the walls and floor by the fluids contained within. The construction equipment of these chemical solutions containers can be any other that resists the mechanical efforts, dynamic efforts and the pressures exerted in the walls and bottom by the fluids as above mentioned.

The chemical solutions containers are covered with plate of polypropylene or high density polyethylene 0.635 cm. of thickness (24) that makes resistant to the acid attack because these materials are inert to used acids, allowing the storage of the solutions per prolonged time, included several decades.

For the transport and immersion of the glass of pieces and/or sheet container, the traveling "bridge" type crane is used with capacity of 3 tons of 15 meters in width. by 20 meters in length and 5 meters in height; said crane has a microelevation, of 0.5 meters per minute and variable speed of elevation of 5.2 meters per minute and variable-speed of motor reducers advance from 5.2 meters per minute to 15.4 meters per minute (27), the crane runs throughout the encapsulated system making the immersion in each one of the bathtubs.

Before initiating the process in the chemical solutions containers the glass pieces are pre-treated with a washing solution that comprising: 55% of water deionized to less than 10 microhms, 5% of hydrofluoric acid at 70%, means, 3.5% of acid with 1.5% of water; and 39.5% of dextrose monohydrate. This solution eliminates all the substances different to the process.

The first chemical solution container or first stage of the immersion, contains an acid solution that consists of: 3 to 8% of hydrofluoric acid to 70%, equivalent to 2.1% to 5.6% total of hydrofluoric acid; from 3 to 8% of hydrochloric acid to 30%, equivalent to 0.9% to 2.4% total of hydrochloric acid; from 10% to 30% of formic acid to 85%, equivalent to 8.5% to 25.5% total of acid formic. These acids previously was dissolved in water (altogether from 4.5% to 12.5%); 20% to 40% of deionized water less than 10 micromhs. The solution contains in addition from 20% to 50% of ammonium bifluoride anhydrous and 5% to 25% of dextrose monohydrate. The components were added in this order, being this one the optimal formulation that makes a chemical reaction (chemical attack) on the surface of the glass pieces and/or sheets by one or both sides (atmospheric side and tinned side), having been indispensable to evaluate the solution acidity, between 4 and 8 miliequivalents per liter, the value of pH must be from 2 to 4, its electrical conductivity is from 700,000 to 900,000 microhms. In this solution the glass pieces will have the speed of immersion from 5.2 meters per minute and the time of immersion from 5 minutes to 30 minutes, depending on the opacity degree if desired in the satin/matte glass.

The second chemical solution container or second stage of the process contains running water for rinsing the glass pieces and/or sheets to eliminate the residues of acid solution, its electrical conductivity is evaluated for optimal reaction. This container had installed a hydro-washed system by sprinkling deionized water less than 10 microhms, by automatic and/or manual way at 3000 pounds of pressure and 5H.P., illustrated in FIG. 15.

The third chemical solution container contains an acidified solution that comprising: 3% to 5% of hydrochloric acid at 30%, equivalent to 0.9% to 1.5% total of hydrochloric acid, 3% to 5% of hydrofluoric acid at 70%, equivalent to 2.1% to 3.5% total of hydrofluoric acid. The acids previously were diluted, and water is added until a concentration from 95% to 97%. This solution stops the chemical reaction on the glass and totally eliminates the residues of acid solution that can exist, being indispensable in this container to evaluate the concentration of solution that must be from 0.5 to 1.0 miliequivalents per liter, at pH from 2.1 to 3.2; and time of immersion can be different from 30 seconds to 3 minutes depending on the number of processed glass sheets; if the number of glass increase the solution is degraded; since it is necessary to stop the acid attack of acids to assure the optimal finished on satin/matte glass.

The fourth chemical solution container has running water that allows to rinse the glass pieces and/or sheet to eliminate the residues of acid solution, this solution will be evaluated for: its electrical conductivity must be less than 60000 microhms. In this container had installed a hydro-washing system by sprinkling deionized water with less 10 microhms, it works when the glass container is leaving the solution container, by automatic and/or manual way at 3000 pounds of pressure of 5H.P. illustrated in the FIG. 13.

The fifth and sixth chemical solutions containers consist of washing solution with deionized water less than 10 microhms, eliminates any possible acid marks on satin/matte glass guaranteeing the safety use. Additionally, also in these containers had installed a hydro-washing system by sprinkling deionized water with less than 10 microhms; it works when the glass container is leaving the solution container, by automatic and/or manual way at 3000 pounds of pressure of 5H.P. (FIG. 15).

The seventh chemical solution container will be reserved for any eventuality that appear during the process. The number of the container may be variable depending on the production necessities.

For the preparation of the solutions used in the process, we used a agitator-tank made of high density polyethylene (inert to the solutions), with a motor reducers; the capacity of this equipment is of 5000 liters, however could be increased according to the production necessities; the raw material is put in the tank and when the solution are prepared they are transported toward chemical container by means of special pumps covered with polypropylene, PVC, or high density polyethylene resistant to acid attack (FIG. 16).

For the production of the deionized water used in the process, we have a water deionizer with ionic interchange resins with a normal flow of 22.7 liters per minute but the capacity must be to increase according to the production necessities.

d) Drying of the Glass Pieces and/or Glass

After chemical processing, the satin/matte glass pieces and/or sheet are passed from its container to a dried chamber by means a crane; said dried chamber is specially designed for working between 30 and 60° C., depending on the production, the dried process is illustrated in FIG. 17, it can be a heating system by means of L.P. gas, natural gas and/or electrical resistance or any other fuel with internal ventilation, this temperature range being able to increase the process productivity and efficiency. As shown in FIG. 17, the glass pieces can be transported by tracks (41) through opening (40) and egressing through opening (44). The dried chamber can include a window (43) and a vent(42).

The drying of the satin glass pieces and/or sheets also can become at room temperature by means of a vertical or horizontal washing-dryer machine, since washing them again and drying them assuring a greater cleaning. Another form of drying is by means of a furnace type tunnel operated with natural gas, L.P. gas and/or electrical resistance, the quality of the satin/matte glass is not affected.

e) Unloading of the Glass Pieces and/or Sheet from its Containers

Once dried the satin/matte glass pieces are transported toward the trestle for delivering and distributing them. The unloading of the satin/matte glass from its containers can be by means of cupping pneumatic system whose 6 cupping are connected to a vacuum pump of ¼ H.P. which is comprised in the system of cranes "flag" type (FIG. 3), with capacity of up to 500 kilograms according to the production necessities.

For monitoring, sampling, analyzing and controlling the parameters established, each chemical solution container has a laboratory equipped support fully process. Using this chemical process by immersion for treatment total or partial glass with satin/matte finish by immersion in acid solution for simultaneous and continuous production of one or several pieces and/or sheet of glass of dimensions, thicknesses, colors, uses and standard, special and variable applications, the process is optimized reutilizing the waste materials; it allows to have a high volume of production because satin/matte one or several pieces and/or sheets is produced on one or both side of the float glass; indistinct manner. The satin/matte glass obtained is with a homogeneous opacity, a smooth texture, fine or rough and degree of opacity can be variable. The raw glass for giving the satin/matte finish can be: normal glass sheet, beveling, tempering glass, cut glass, drilled glass, laminated glass, serigraphic glass, thermo-formed glass and mirror-like. The process diminished the risks to acid manipulation because the personnel have been trained about dangerous of the solutions and residues, each stages is carefully made.

The process established in this request is highly better than the already-known process, for example the traditional process only satin/matte the atmospheric side; in contrast our process can be satin/matte both sides included tinned side, besides the process is safety and versatile. It is important consider that the process can be produced independently of age of the glass.

All and each stages of process are made at room temperature, at atmospheric pressure and relative humidity except the continuous dried chamber.

What is clamed is:

1. A chemical-process for applying a satin/matte finish to glass pieces and/or sheets of float glass, said glass pieces and/or sheets of float glass being treated on at least one side of an atmospheric side and a tinned side, the process comprising:
    a) reception of the glass pieces and/or sheets;
    b) loading of the glass pieces and/or sheets in at least one container;
    c) processing one or more glass pieces and/or sheets for applying a satin/matte finish to at least a portion of the one or more glass pieces and/or sheets by immersion in containers, wherein the immersion step in the containers consists of treating the glass pieces and/or sheets by the following solutions:
        i. washing and cleaning solution consisting of:
            57% by volume of deionized water to less than 10 microhms, 3.5% of hydrofluoric acid by volume and 39.5% by volume of a dextrose monohydrate solution, in an amount sufficient to provide a pretreatment for eliminating all of the substances different to the glass;
        ii. acid solution consisting of:
            (i) from 3% to 8% of hydrofluoric acid at 70%, by volume;
            (ii) from 3% to 8% of hydrochloric acid at 30%, by volume;
            (iii) from 10% to 30% of formic acid at 85%, by volume;
            (iv) from 20% to 40% of deionized water, by volume with less 10 microhms;
            (v) from 20% to 50% ammonium bifluoride, by volume;
            (vi) from 5% to 25% by volume of a sugar dextrose monohydrate solution, sufficient to provide
            the acid solution with an acidity in the range of about 4 to 8milliequivalents per liter, and an electrical conductivity from 700,000 to 900,000 microhms, and
            wherein the speed of immersion of each of the one or more glass pieces in the acid solution is in the range of about 5.2 to 19.3 meters per minute and the time of immersion of the glass sheets within the solution is in the range of about 5 minutes to 30 minutes depending on the opacity degree;

iii. washed for rinsing solution where, the washed for rinsing solution is made by immersion of the glass pieces and/or sheets in water and sprinkling with deionized water, wherein the speed of immersion of the glass pieces and/or sheets is in the range of about 5.2 meters per minute and the time of immersion is by intervals of about 30 seconds from 3 to 6 times, iv. acidified and washed stop solution, wherein the acidified and washed stop solution is prepared from about 3% to 5% of hydrochloric acid at about 30%, by volume, and from about 3% to 5% of hydrofluoric acid at about 70%, by volume; wherein this solution stops the chemical reaction on the glass and eliminates the rest of the chemical substances adhered to the glass during the process, wherein the speed of immersion of the glass sheet(s) of is in the range of about 5.2 meters per minute and the time of immersion is in the range of 3-6 intervals of about 30 seconds for each interval;

v. washing solution, wherein the washing solution contains deionized water and wherein this washing eliminates all impurity from the process; the sheets of glass are clean, neutral, and inert; while guaranteeing full physical and environment safety for applying a satin/matte finish to float glass, vii. washing solution (optional), d. drying of the glass pieces and/or sheets;
e. unloading of the glass pieces and/or sheets from its containers.

* * * * *